US009558579B2

United States Patent
Lee et al.

(10) Patent No.: US 9,558,579 B2
(45) Date of Patent: Jan. 31, 2017

(54) APPARATUS AND METHOD FOR SYNTHESIZING ADDITIONAL INFORMATION WHILE RENDERING OBJECT IN 3D GRAPHIC-BASED TERMINAL

(75) Inventors: Sang-Kyung Lee, Anyang-si (KR); Kwang-Cheol Choi, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 492 days.

(21) Appl. No.: 13/197,533

(22) Filed: Aug. 3, 2011

(65) Prior Publication Data
US 2012/0032950 A1    Feb. 9, 2012

(30) Foreign Application Priority Data
Aug. 3, 2010 (KR) .................. 10-2010-0074845

(51) Int. Cl.
G06T 15/00 (2011.01)
H04N 13/00 (2006.01)
H04N 13/02 (2006.01)

(52) U.S. Cl.
CPC ............. G06T 15/00 (2013.01); H04N 13/004 (2013.01); H04N 13/007 (2013.01); G06T 2200/24 (2013.01); H04N 13/0022 (2013.01); H04N 13/0275 (2013.01)

(58) Field of Classification Search
CPC .............. H04N 13/0022; H04N 19/597; H04N 13/0018; G06T 2200/08
See application file for complete search history.

(56) References Cited

U.S. PATENT DOCUMENTS

| | | | |
|---|---|---|---|
| 7,330,584 B2* | 2/2008 | Weiguo et al. | 382/154 |
| 2007/0195082 A1 | 8/2007 | Takanashi et al. | |
| 2007/0236498 A1 | 10/2007 | Higuchi et al. | |
| 2008/0094398 A1* | 4/2008 | Ng et al. | 345/427 |
| 2009/0319168 A1 | 12/2009 | Sugimoto | |
| 2010/0091012 A1 | 4/2010 | Newton et al. | |
| 2011/0169825 A1 | 7/2011 | Ishiyama et al. | |

FOREIGN PATENT DOCUMENTS

| | | |
|---|---|---|
| JP | 2007-200227 | 8/2007 |
| JP | 2010-003007 | 1/2010 |

(Continued)

OTHER PUBLICATIONS

Karasuda, Eric, and Sara McMains. "Textual annotation in a head tracked, stereoscopic virtual design environment." Proceedings of DETC04 2004 ASME Design Engineering Technical Conferences. 2004.*

(Continued)

*Primary Examiner* — Kee M Tung
*Assistant Examiner* — Whitney Pointe

(57) ABSTRACT

An apparatus and a method synthesize additional information while rendering an object in a 3D-based terminal. A disparity of the additional information is determined with a value that is equal to a disparity of an object or greater than the disparity of the object by a predetermined value in a situation in which the object hidden by the additional information is to be synthesized using a depth buffer. The additional information is overlaid on an image with consideration of the determined disparity of the additional information.

28 Claims, 9 Drawing Sheets

(56) References Cited

FOREIGN PATENT DOCUMENTS

| JP | 2010-086228 | 4/2010 |
| KR | 10-2007-0097352 | 10/2007 |
| WO | WO 2007017834 A3 * | 9/2007 |
| WO | WO 2010151555 A1 * | 12/2010 |

OTHER PUBLICATIONS

Notice of Preliminary Rejection dated Jun. 15, 2016 in connection with Korean Application No. 10-2010-0074845, 12 pages.
Jonathan Shade, et al., "Layered Depth Images", Proceedings of the 25th Annual Conference on Computer Graphics and Interactive Techniques ACM, 1998, 12 pages.

* cited by examiner

US 9,558,579 B2

APPARATUS AND METHOD FOR SYNTHESIZING ADDITIONAL INFORMATION WHILE RENDERING OBJECT IN 3D GRAPHIC-BASED TERMINAL

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Aug. 3, 2010 and assigned Serial No. 10-2010-0074845, the entire disclosure of which is hereby incorporated by reference.

TECHNICAL FIELD OF THE INVENTION

The present invention relates to a three-dimensional (3D)-based terminal. More particularly, the present invention relates to an apparatus and a method for synthesizing additional information while rendering an object in a 3D-based terminal.

BACKGROUND OF THE INVENTION

A 3D-based terminal according to an embodiment of the present invention denotes a terminal that may allow an image that has been rendered by a terminal that may output a stereoscopic multiview using a 3D-based technology to be viewed as a disparity-based stereo image.

Recently, a virtual reality system, computer games, and such, are rapidly developing, such that a technology for expressing an object, a terrain, and such, of a real world in terms of three-dimension (3D) using a computer system is being studied and developed.

Generally, a user may feel a 3D effect by viewing, an object in different directions via a left eye and a right eye. Therefore, when a 2D plane display apparatus simultaneously displays two images that reflect a difference between a left eye and a right eye, that is, a disparity, the user feels a relevant image three dimensionally.

Accordingly, the conventional art provides a technique for obtaining two images that reflect the disparity using a virtual camera. That is, a method of generating the disparity in a virtual space via frustum parameter setting of the virtual camera using the virtual camera in a vertex processing operation of a general 3D graphic pipeline, and rendering the disparity according to the conventional pipeline to obtain two images that reflect the disparity has been provided.

Meanwhile, the generally serviced 3D contents overlay various additional information, for example, a user interface (UI) tool bar, subtitles, a chatting window, a popup menu, an interaction information display window, a mouse pointer, and a cursor overlaid for an interface on a personal computer (PC) on an image obtained by rendering a virtual world.

Because the image on which the additional information is to be overlaid is an image that includes a 3D effect, the additional information should be rendered to have a disparity in order to provide a natural stereo image to a user. However, when 3D contents that do not consider 3D conversion are automatically converted, additional information has disparity with no consistency with the disparity of objects forming a scene, or is rendered without disparity. In this situation, because the perspective formed by the disparity of an object output behind the additional information and the disparity of the additional information is not natural in a final image, the unnatural perspective disturbs a 3D effect felt by a user and increases fatigue of the user's eyes. In addition, even when 3D conversion is considered during production of 3D contents, it is difficult to consider the position of the additional information while considering 3D conversion with respect to all scenes in 3D contents where various scenes are generated according to the user's degree of freedom. Accordingly, a restriction condition that limits additional information position and a 3D effect provided to a final image occurs.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for synthesizing additional information while rendering an object in a 3D-based terminal.

Another aspect of the present invention is to provide an apparatus and a method for synthesizing additional information using a depth buffer of a vertex processor or a pixel processor inside a graphic processor in a 3D-based terminal.

Another aspect of the present invention is to provide an apparatus and a method for determining disparity of additional information with a value greater than disparity of an object hidden by the additional information using a depth buffer, and reflecting the determined disparity of the additional information to overlay the additional information on a relevant object inside an image in a 3D-based terminal.

Another aspect of the present invention is to provide an apparatus and a method for determining a synthesis region with a region with a disparity less than or equal to an allowable disparity of additional information using a depth buffer, and inserting the additional information into the determined synthesis region in a 3D-based terminal.

Yet another aspect of the present invention is to provide an apparatus and a method for determining disparity of additional information with a value greater than the disparity of an object hidden by the additional information using a distance on a virtual space between the object hidden by the additional information and a screen, and reflecting the determined disparity of the additional information to overlay the additional information on a relevant object inside an image.

In accordance with an aspect of the present invention, a method for synthesizing additional information in a 3D-based terminal is provided. The method includes determining a disparity of the additional information with a value that is one of equal to a disparity of an object and greater than the disparity of the object by a predetermined value, the object hidden by the additional information to be synthesized using a depth buffer. The additional information is overlaid on an image with consideration of the determined disparity of the additional information.

In accordance with another aspect of the present invention, a 3D-based terminal for synthesizing additional information is provided. The terminal includes an additional information disparity determination and synthesis region detector and an additional information synthesizer. The additional information disparity determination and synthesis region detector determines a disparity of the additional information with a value that is one of equal to a disparity of an object and greater than the disparity of the object by a predetermined value, the object hidden by the additional information to be synthesized using a depth buffer. The additional information synthesizer overlays the additional information on an image with consideration of the determined disparity of the additional information.

In accordance with another aspect of the present invention, terminal that supports three-dimensional (3D) graphics for synthesizing additional information is provided. The terminal includes a graphic processor and a display unit. The graphic processor, which processes 3D graphic data, includes an additional information disparity determination and synthesis region detector and an additional information synthesizer. The additional information disparity determination and synthesis region detector determines a disparity of the additional information with a value that is one of equal to a disparity of an object and greater than the disparity of the object by a predetermined value, the object hidden by the additional information to be synthesized using a depth buffer. The additional information synthesizer overlays the additional information on an image with consideration of the determined disparity of the additional information. The display unit displays the processed 3D graphic data.

In accordance with yet another aspect of the present invention, a method for synthesizing additional information in a three-dimensional (3D)-based terminal is provided. 3D graphic data is processed. A disparity of the additional information is determined with a value that is one of equal to a disparity of an object and greater than the disparity of the object by a predetermined value, the object hidden by the additional information to be synthesized using a depth buffer. The additional information is overlaid on an image with consideration of the determined disparity of the additional information. The processed 3D graphic data is displayed.

Other aspects, advantages and salient features of the invention will become apparent to those skilled in the art from the following detailed description, which, taken in conjunction with the annexed drawings, discloses embodiments of the invention.

BRIEF DESCRIPTION OF THE DRAWINGS

The above and other aspects, features and advantages of certain embodiments of the present invention will be more apparent from the following description taken in conjunction with the accompanying drawings in which.

Throughout the drawings, like reference numerals will be understood to refer to like parts, components and structures.

DETAILED DESCRIPTION OF THE INVENTION

Figure 1:
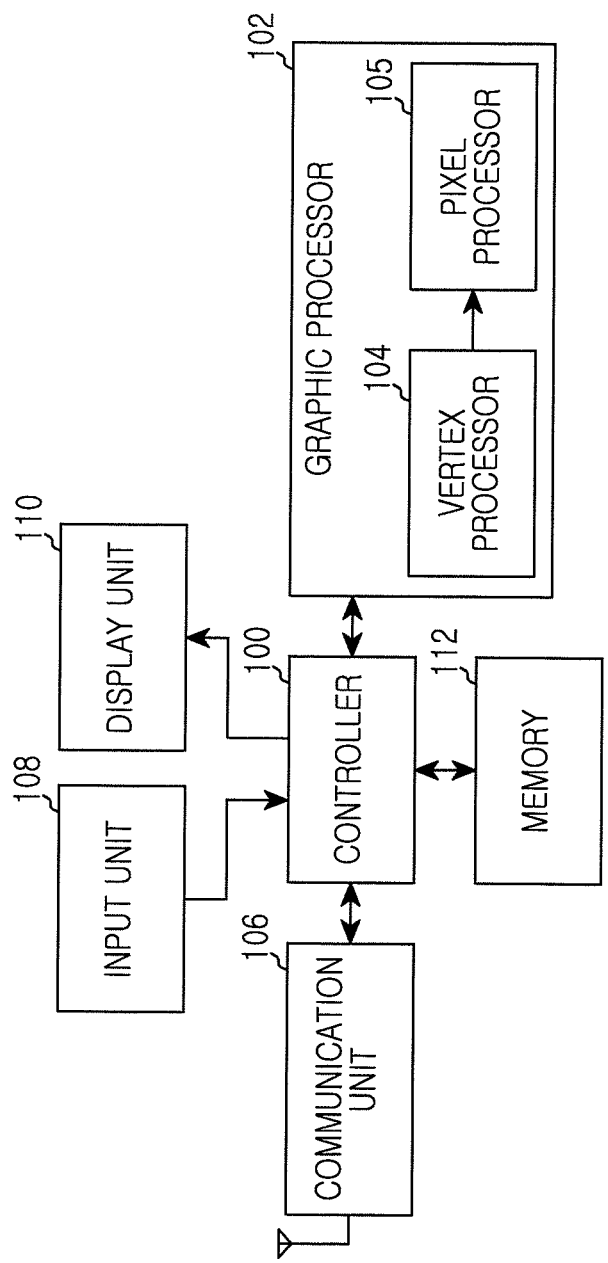
FIG. 1 is a block diagram of a 3D-based terminal according to an embodiment of the present invention.

The following description, with reference to the accompanying drawings, is provided to assist in a comprehensive understanding of embodiments of the invention as defined by the claims and their equivalents. It includes various specific details to assist in understanding the present disclosure, but these are to be regarded as examples only. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings but are merely used by the inventor to enable a clear and consistent understanding of the invention. Accordingly, it should be apparent to those skilled in the art that the following description of embodiments of the present invention are provided for illustration purposes only and not for the purpose of limiting the scope of the invention as defined by the appended claims and their equivalents.

Embodiments of the present invention provide an alternative for synthesizing additional information while rendering an object in a 3D-based terminal. The 3D-based terminal used in an embodiment of the present invention denotes a terminal that may allow an image that has been rendered by a terminal that may output a stereoscopic multiview using a 3D-based technology to be viewed as a disparity-based stereo image.

Methods for synthesizing additional information according to an embodiment of the present invention are classified into three types according to whether a depth buffer is usable and an attribute (more particularly, position variance) of the additional information when the depth buffer is usable. That is, the methods for synthesizing additional information are classified into a method for synthesizing additional information using a depth buffer via a pixel processor inside a graphic processor, and a method for synthesizing additional information via a vertex processor inside a graphic processor depending on whether a depth buffer is usable in synthesizing the additional information and a final stereo image. In addition, the methods for synthesizing additional information using the depth buffer are classified into a method for overlaying the additional information on an object such that the additional information has disparity greater than that of an object, and a method for inserting additional information into a region that meets an allowed disparity of the additional information depending on the attribute (more particularly, position variance) of the additional information. Such classification depends on an embodiment. The present invention does not limit a reference of the classification. In addition, each method may be realized independently and may be realized in one or more different combinations.

In the following description, a terminal denotes all of a cellular phone, a personal communication system (PCS), a personal data assistant (PDA), an International Mobile Telecommunications-2000 (IMT-2000) terminal, a personal computer (PC), a notebook, a television (TV), and such. Description will be made using a general construction of the above examples.

In addition, in the following description, additional information denotes a User Interface (UI) tool bar, subtitles, a chatting window, a popup menu, an interaction information display window, a mouse pointer, and a cursor overlaid for an interface on a PC.

FIG. 1 is a block diagram of a 3D-based terminal according to an embodiment of the present invention.

As illustrated in FIG. 1, the terminal includes a controller 100, a graphic processor 102, a communication unit 106, an input unit 108, a display unit 110, and a memory 112. The graphic processor 102 includes a vertex processor 104 and a pixel processor 105.

Referring to FIG. 1, the controller 100 controls an overall operation of the terminal. According to an embodiment of the present invention, the controller 100 processes a function for synthesizing additional information on a final image while rendering an object in a 3D-based terminal. More particularly, the controller 100 controls the vertex processor 202 or the pixel processor 206 to synthesize the additional information on the final image depending on whether a depth buffer is usable in synthesizing the additional information and the final image, and the attribute (more particularly, position variance) of the additional information when the depth buffer is usable.

The graphic processor 102 includes the vertex processor 104 and the pixel processor 105 to process 3D graphic data. In addition to the general function, according to an embodiment of the present invention, the graphic processor 102 synthesizes additional information on the final image while rendering an object under control of the controller 100. Detailed construction of the graphic processor 102 is described with reference to FIG. 2.

The communication unit 106 includes a radio frequency (RF) transmitter for up-converting and amplifying a frequency of a transmission signal, and an RE receiver for low-noise amplifying a received signal and down-converting a frequency of the received signal.

The input unit 108 includes a plurality of function keys such as a numerical key button, a menu button, a cancel button (delete), an OK button, and such, and provides key input data corresponding to a key pressed by a user to the controller 100.

The display unit 110 displays state information occurring during an operation of the terminal, a limited number of letters, a large amount of moving images and still images, and such. More particularly, the display unit 110 displays the processed 3D graphic data (that is, a final image on which additional information has been synthesized). The display unit 110 may be a liquid crystal display (LCD). In addition, the display unit 110 is a unit that includes a physical characteristic that supports a stereoscopic multiview image.

The memory 112 stores microcodes of programs for processing and controlling the controller 100 and various reference data, and stores temporary data occurring during execution of various programs. More particularly, according to an embodiment of the present invention, the memory 112 stores a program for synthesizing additional information on a final image while rendering an object in a 3D-based terminal. In addition, the memory 112 stores a predetermined attribute in additional information to be synthesized on the final image. Here, the predetermined attribute of the additional information includes a horizontal pixel size, a vertical pixel size, whether to allow scale, an allowed disparity, whether position is variable, and such.

Figure 2:
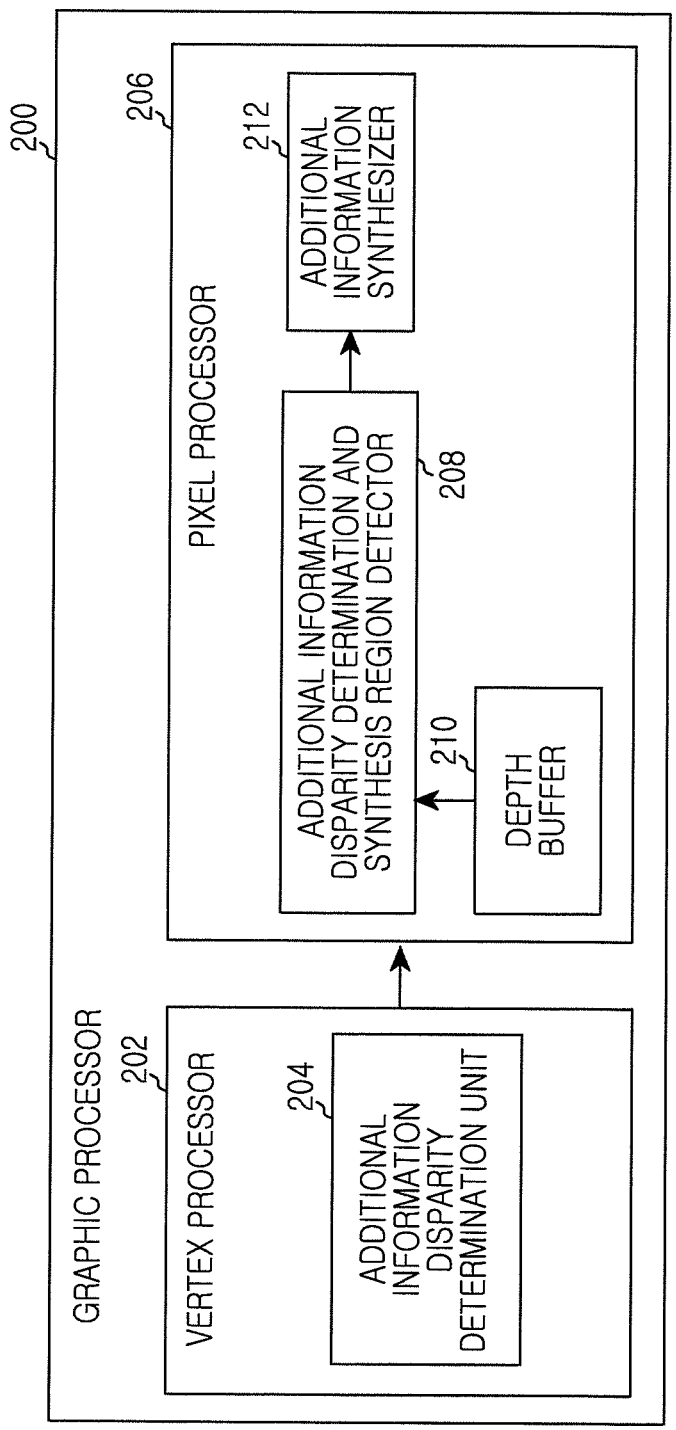
FIG. 2 is a block diagram of a graphic processor in a 3D-based terminal according to an embodiment of the present invention.

FIG. 2 is a block diagram of a graphic processor in a 3D-based terminal according to an embodiment of the present invention.

Referring to FIG. 2, the graphic processor 200 includes a vertex processor 202 and a pixel processor 206. The vertex processor 202 includes an additional information disparity determination unit 204. The pixel processor 206 includes an additional information disparity determination and synthesis region detector 208, a depth buffer 210, and an additional information synthesizer 212.

First, the vertex processor 202, which is functionally equivalent to the vertex processor 104 of FIG. 1, performs a vertex processing operation of a 3D graphic pipeline. Here, the vertex processing operation entails converting an object in a 3D coordinate system, primarily depending on a visual point, and projecting the object onto a 2D coordinate system. That is, the vertex processing unit 202 defines an object coordinate system that uses the center of a relevant object as the center of a coordinate axis based on vertex information (that is, coordinate information) for each object existing in a space, generates a camera coordinate system that uses a virtual camera point as a center based on the defined object coordinate system for each object, and projects the camera coordinate system to convert the same to a clip coordinate system.

In addition to the general functions, according to an embodiment of the present invention, the additional information disparity determination unit 204 inside the vertex processor 202 synthesizes a final stereo image and additional information under control of the controller 100. That is, the additional information disparity determination unit 204 determines the disparity of the additional information to be a value greater by a predetermined value than the disparity or equal to the disparity of a hidden object using a distance (that is, a depth value on a space of the hidden object) on a virtual space between the object hidden by the additional information to be synthesized and a screen, and provides the determined disparity of the additional information to the additional information synthesizer 212 of the pixel processor 206. At this point, the additional information synthesizer 212 of the pixel processor 206 may synthesize the additional information on a final stereo image by reflecting the determined disparity of the additional information to overlay the additional information on a relevant object inside the image.

Next, the pixel processor 206, which is functionally equivalent to the pixel processor 105 of FIG. 1, performs a pixel processing operation of a 3D graphic pipeline, for example, an alpha test, a Z test, a stencil test, and such. Here, the Z test denotes a test for determining the depth of each object inside a final image based on a depth value of each pixel stored in the depth buffer 210.

In addition to the general functions, according to an embodiment of the present invention, the additional information disparity determination and synthesis region detector 208 of the pixel processor 206 synthesizes a final stereo image and additional information under control of the controller 100. That is, the additional information disparity determination and synthesis region detector 208 determines the disparity of the additional information with a value greater by a predetermined value than the disparity or equal to the disparity of an object hidden by the additional information to be synthesized using the depth buffer 210, and provides the determined disparity of the additional information to the additional information synthesizer 212. At this point, the additional information synthesizer 212 may synthesize the additional information on a final stereo image by reflecting the determined disparity of the additional information to overlay the additional information on the relevant object inside the image.

Figure 3:
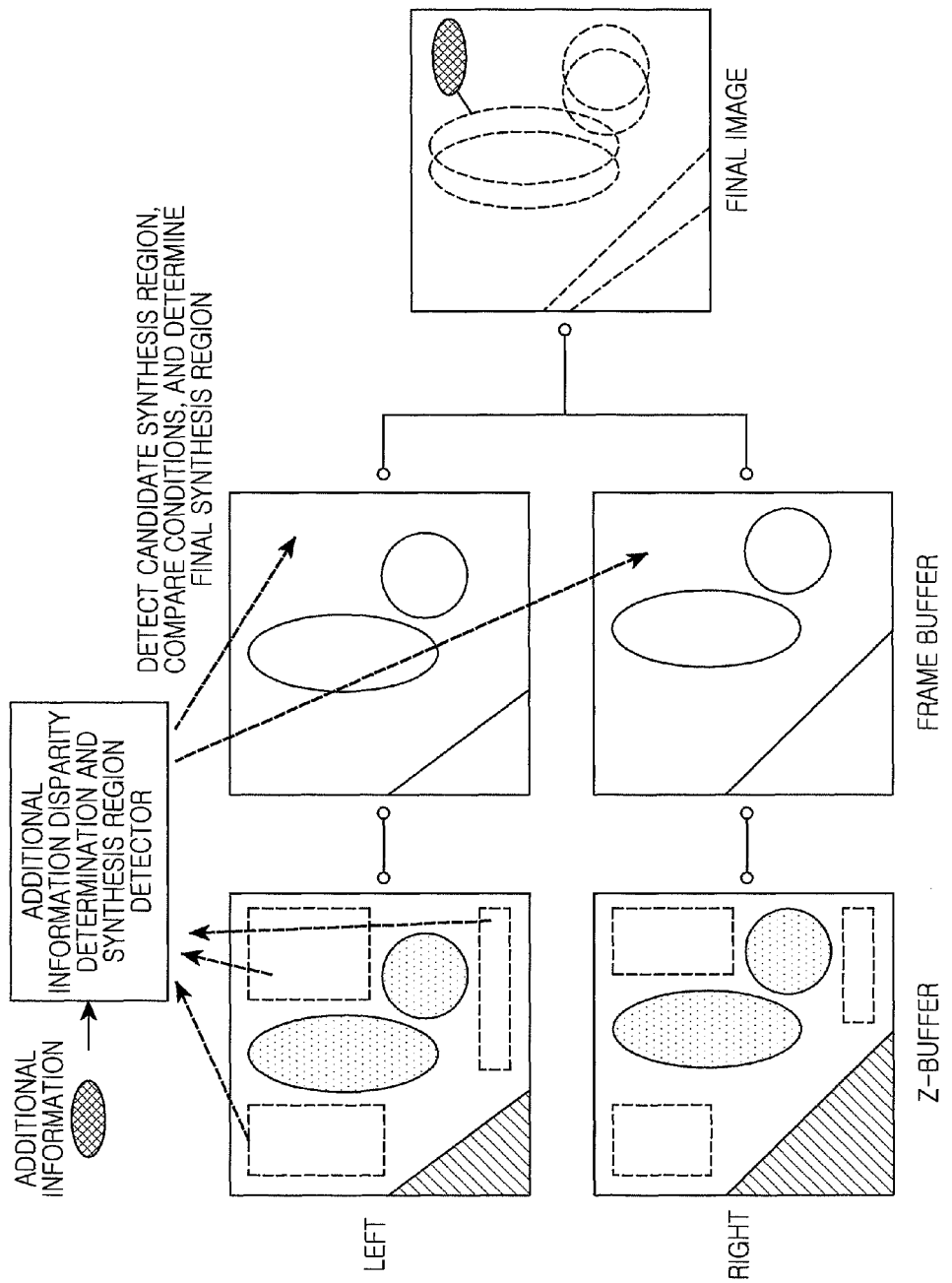
FIG. 3 illustrates an example of a process for synthesizing additional information while rendering an object in a pixel processor inside a 3D-based terminal according to an embodiment of the present invention.

Alternatively, the additional information disparity determination and synthesis region detector 208 detects a candidate synthesis region inside the image into which the additional information may be inserted as a region with a disparity less than or equal to an allowed disparity set in advance to additional information to be synthesized using the depth buffer 210. That is, according to FIG. 3, the additional information disparity determination and synthesis region detector 208 converts an allowed disparity of the additional information to be synthesized into depth values on left and right depth buffers, and compares the depth values corresponding to the allowed disparity with depth values of respective pixels inside the left and right depth buffers to detect a region including pixels with depth values greater than or equal to the depth value corresponding to the allowed disparity as the selected candidate synthesis region of the additional information. After that, the additional information disparity determination and synthesis region detector 208 determines an arbitrary portion of the detected candidate synthesis region into which the additional information may be inserted as a final synthesis region, and then provides information regarding the determined final synthesis region to the additional information synthesizer 212. At this point, the additional information synthesizer 212 may synthesize the additional information on the final stereo image by inserting the additional information into the determined final synthesis region.

Here, the depth buffer 210 inside the pixel processor 206 is realized as a Z buffer to store a depth value of each pixel and generate depth values with respect to a left image and a right image, respectively. Here, a depth value of each pixel inside the depth buffer 210 reflects a disparity to be reflected on the final stereo image.

Figure 4:
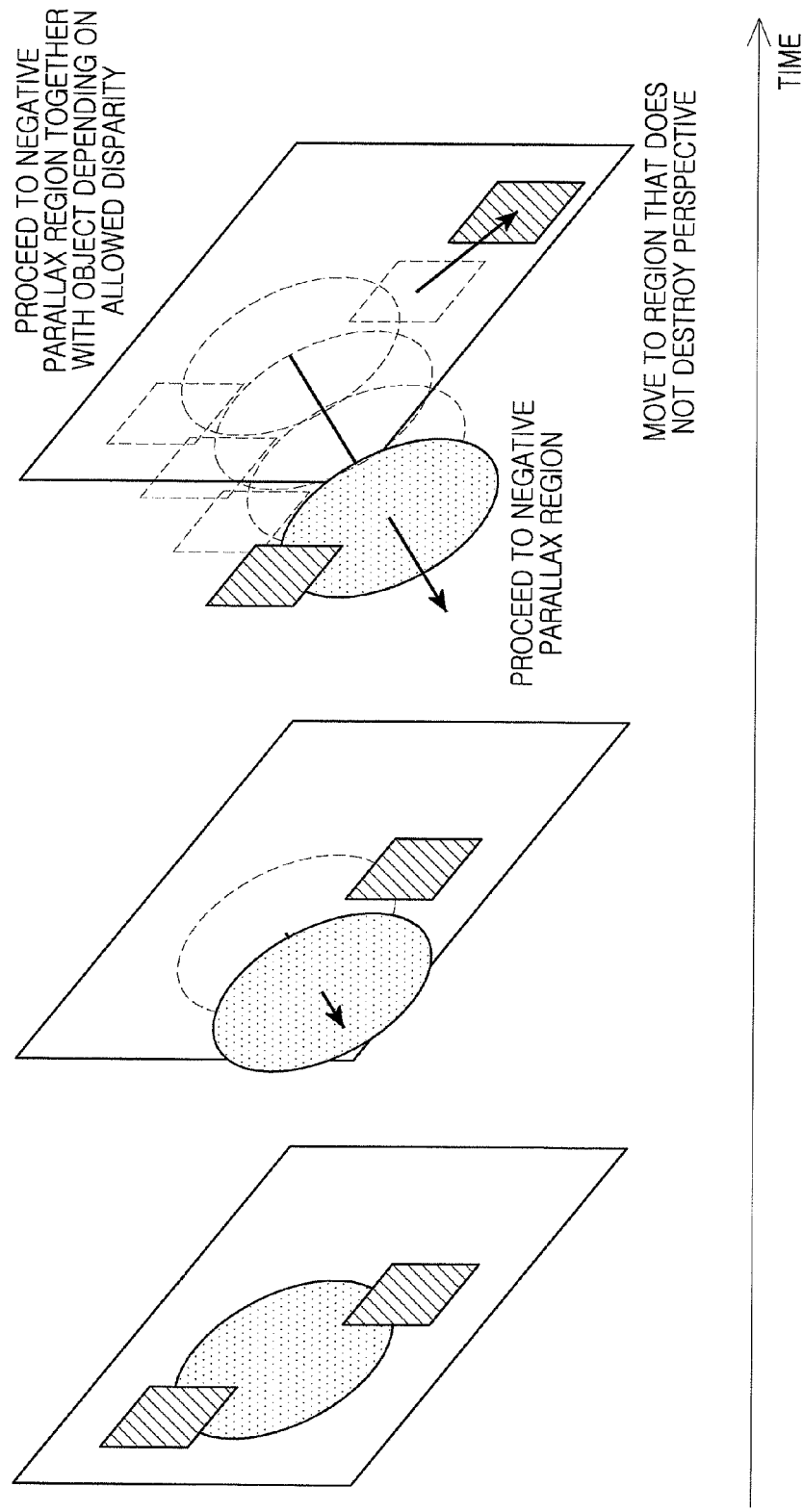
FIG. 4 illustrates an example of a process for synthesizing additional information while rendering an object in a pixel processor inside a 3D-based terminal according to an embodiment of the present invention.

FIG. 4 illustrates an example of a process for synthesizing additional information while rendering an object in a pixel processor inside a 3D-based terminal according to an embodiment of the present invention.

Figure 6:
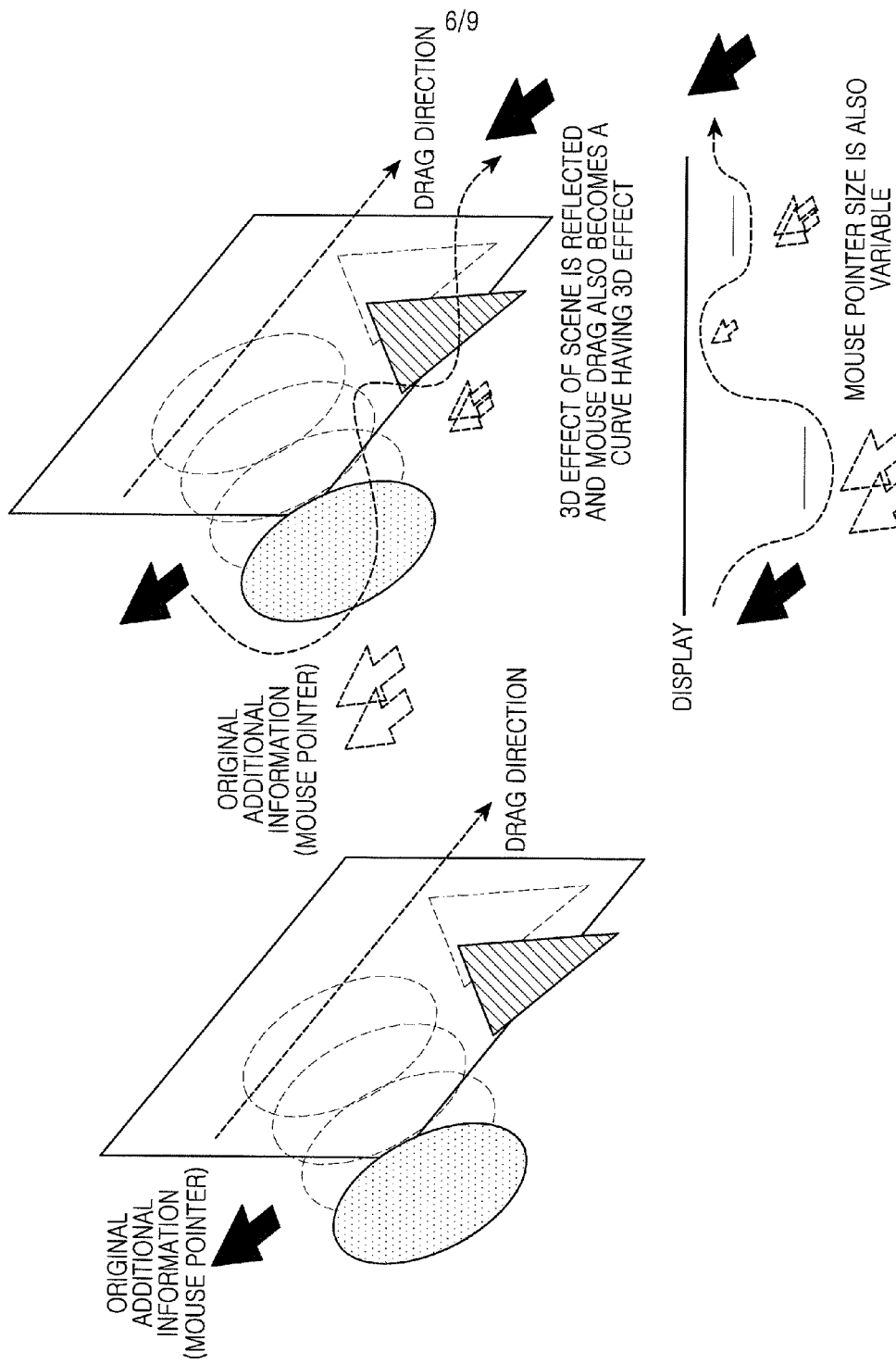
FIG. 6 illustrates an example of a process for synthesizing additional information while rendering an object in a pixel processor inside a 3D-based terminal according to an embodiment of the present invention.

Referring to FIG. 4, a plane illustrated on a virtual space represents a zero parallax region where disparity is zero ('0'), which denotes a boundary between a negative parallax region on which an image is formed before the zero parallax visual point, and a positive parallax region where an image is formed after the zero parallax visual point. When a region on which an image of an object is formed proceeds from the zero parallax region to the negative parallax region as time elapses, a terminal may synthesize the additional information on an image while allowing a region on which the image of the additional information is formed to proceed from the zero parallax region to the negative parallax region such that the image of the additional information is formed before the image of the object. Accordingly, movement of the additional information that reflects change of a 3D effect naturally may be realized. At this point, when additional information (for example, a mouse pointer) has position variance and thus has a variable position in an image, the additional information also may have a variable position and size such that the image of the additional information may be formed before the image of each object depending on the position and the parallax region of each object existing inside the image according to FIG. 6. That is, depending on a degree of a 3D effect held by an image, when the mouse pointer passes before an object that projects to the front much, the mouse pointer of feeing as if it were positioned to the further front side may be output on a screen, and when the mouse pointer passes before an object that relatively collapses, the mouse pointer may be output on the screen to have a 3D effect suitable for the collapsing object. In addition, the size of the mouse pointer may be varied depending on a 3D effect (that is, a large image as it projects to the front), such that a natural mouse pointer may be realized.

Figure 5:
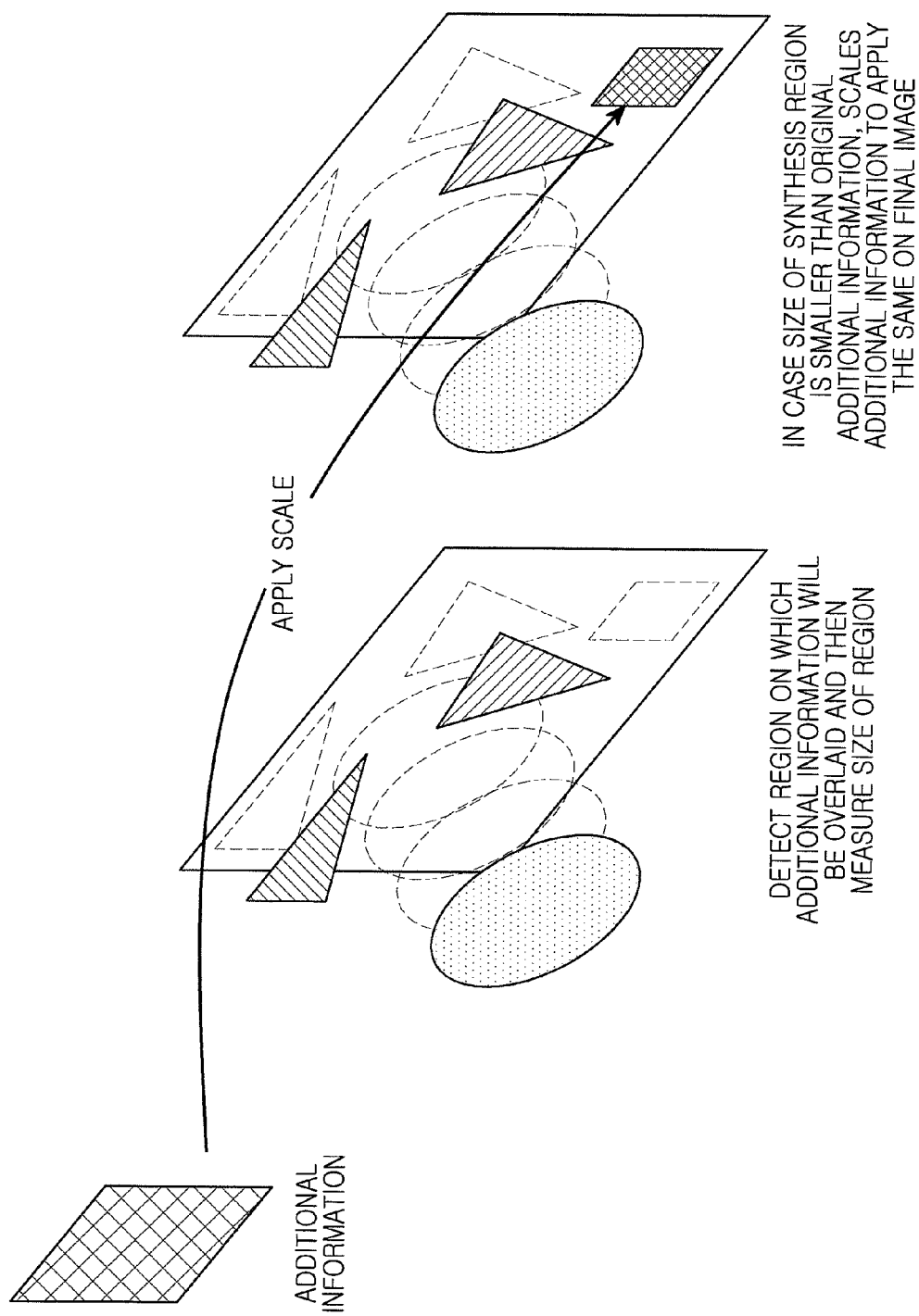
FIG. 5 illustrates an example of a process for synthesizing additional information while rendering an object in a pixel processor inside a 3D-based terminal according to an embodiment of the present invention.

Alternatively, a terminal may move a region on which the image of the additional information is formed from the zero parallax region to a region that does not destroy perspective of the object, and synthesize the additional information on the image on the moved region. At this point, when the size of a region on which the additional information is to be synthesized is smaller than the additional information, the terminal may scale down the additional information to reduce the same and apply the additional information to a final image according to FIG. 5. In this situation, a scale support should be included in an attribute set in advance to the additional information.

Figure 7:
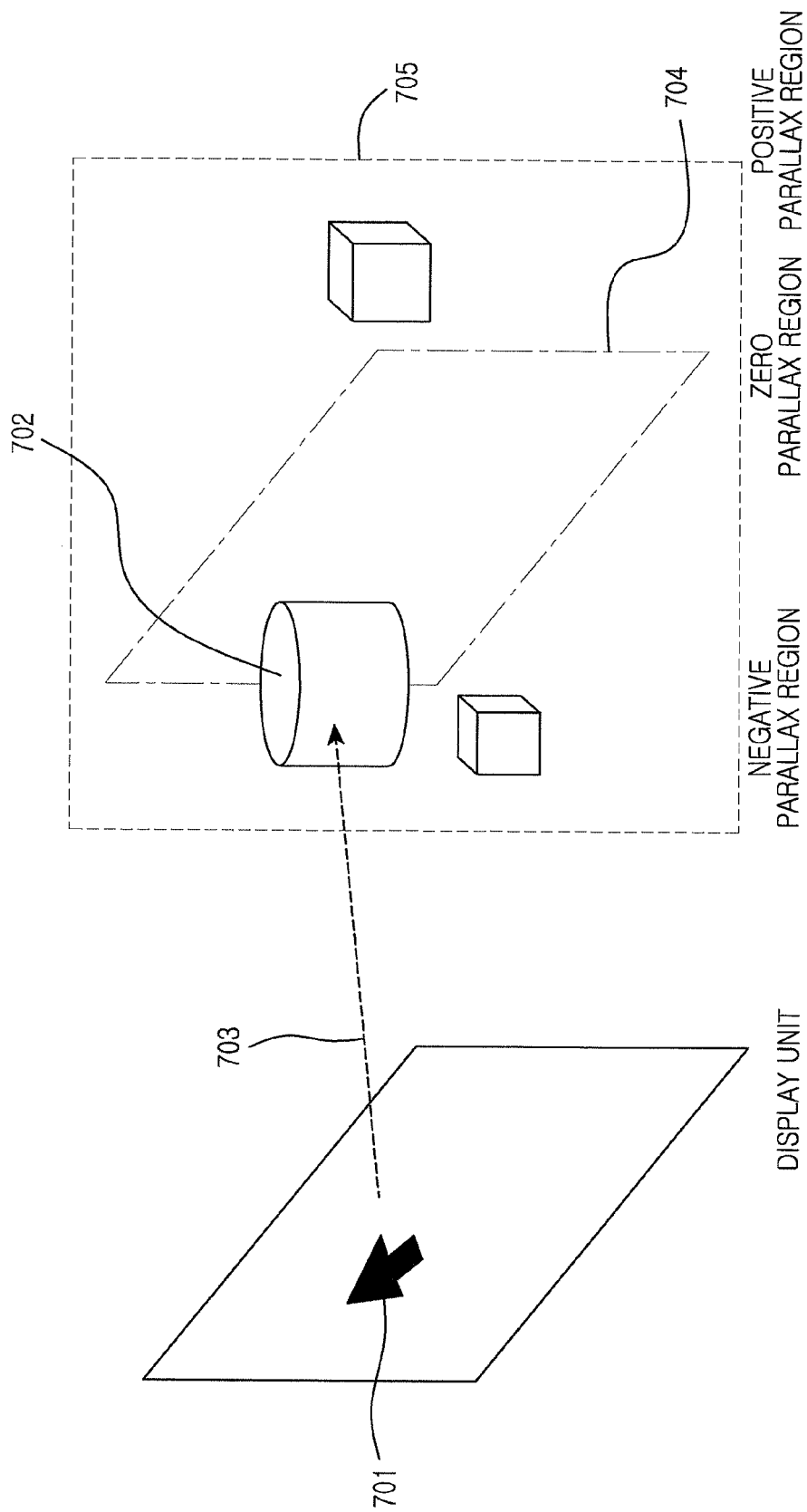
FIG. 7 illustrates an example of a process for synthesizing additional information while rendering an object in a vertex processor inside a 3D-based terminal according to an embodiment of the present invention.

FIG. 7 illustrates an example of a process for synthesizing additional information while rendering an object in a vertex processor inside a 3D-based terminal according to an embodiment of the present invention.

Referring to FIG. 7, the terminal determines the disparity of additional information 701 with a value greater by a predetermined value than the disparity or equal to the disparity of a hidden object 702 using a distance on a virtual space (that is, a depth value on a space of the hidden object) between the object 702 hidden by the additional information 701 to be synthesized and a screen, and reflects the determined disparity of the additional information 701 to overlay the additional information 701 to the relevant object 702 inside an image, thereby synthesizing the additional information 701 on a final stereo image.

For this purpose, the terminal defines an object coordinate system that uses the center of a relevant object as the center of a coordinate axis based on vertex information (that is, coordinate information) for each object 702 existing in a virtual space 705, and configures a camera coordinate system (or eye coordinate system) that uses a virtual camera point as a center based on the defined object coordinate system for each object. A plane 704 on the virtual space 705 represents a zero parallax region where disparity is 0, which denotes a boundary between a negative parallax region on which an image is formed before the zero parallax visual point, and a positive parallax region where an image is formed after the zero parallax visual point.

After that, the terminal extends a line segment along a Z-axis from a coordinate (x, y) on the screen at which the additional information 701 is to be finally positioned to determine a vertex of the object 702 that meets the line segment in the virtual space 705. The terminal determines a distance 703 between the object 702 and the screen using the determined vertex of the object 702 and the coordinate on the screen of the additional information 701, and determines a distance on the virtual space between the additional information 701 and the screen using a distance less by a predetermined value than the determined distance or equal to the determined distance 703. Therefore, the terminal may determine the disparity of the additional information 701 using a value greater by a predetermined value than the disparity or equal to the disparity of the object 702 hidden by the additional information 701, and accordingly, may synthesize the additional information 701 in a negative parallax region by a 3D effect held by the object 702.

Figure 8A:
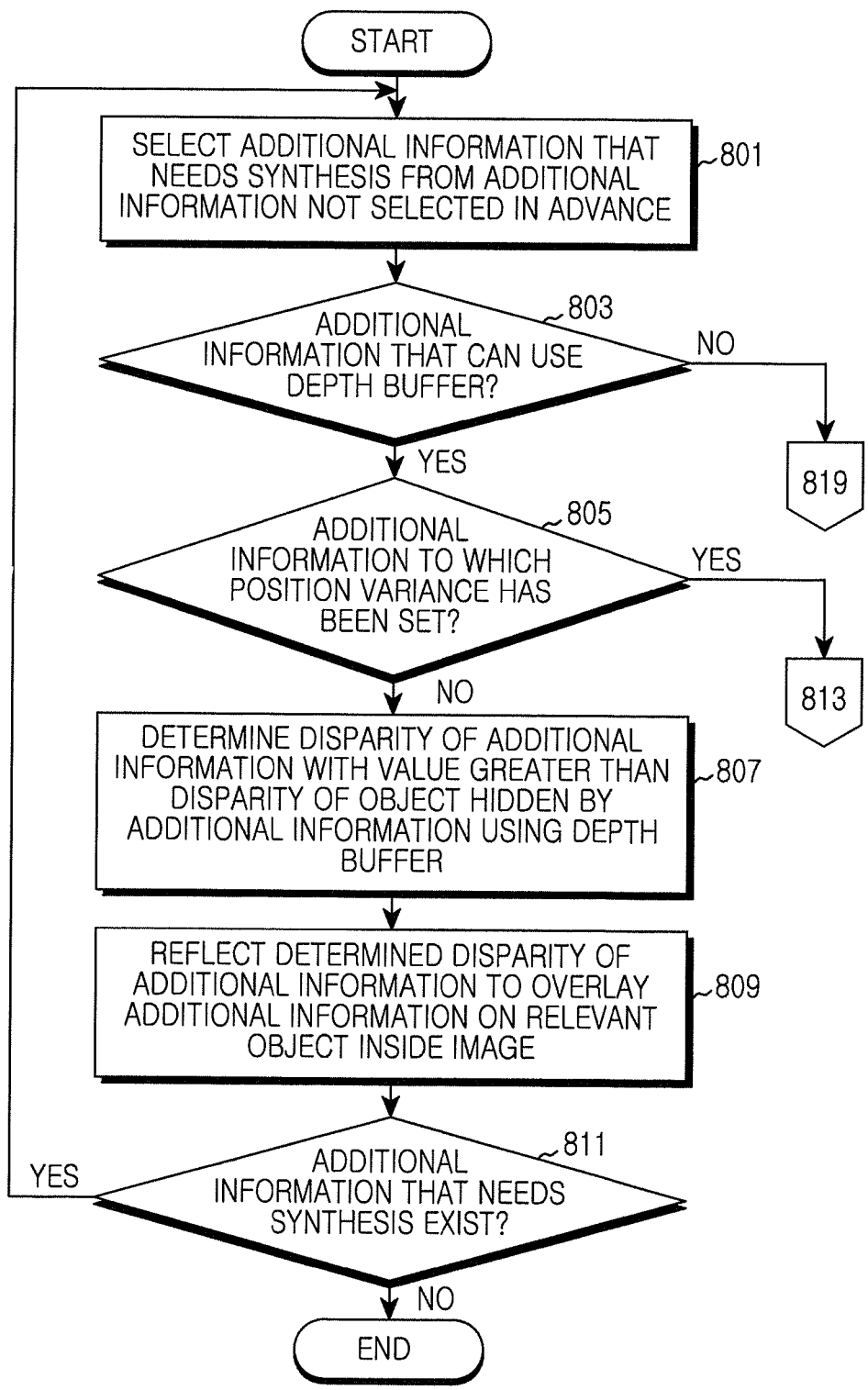
FIGS. 8A and 8B illustrate a process for synthesizing additional information while rendering an object in a 3D-based terminal according to an embodiment of the present invention.
Figure 8B:
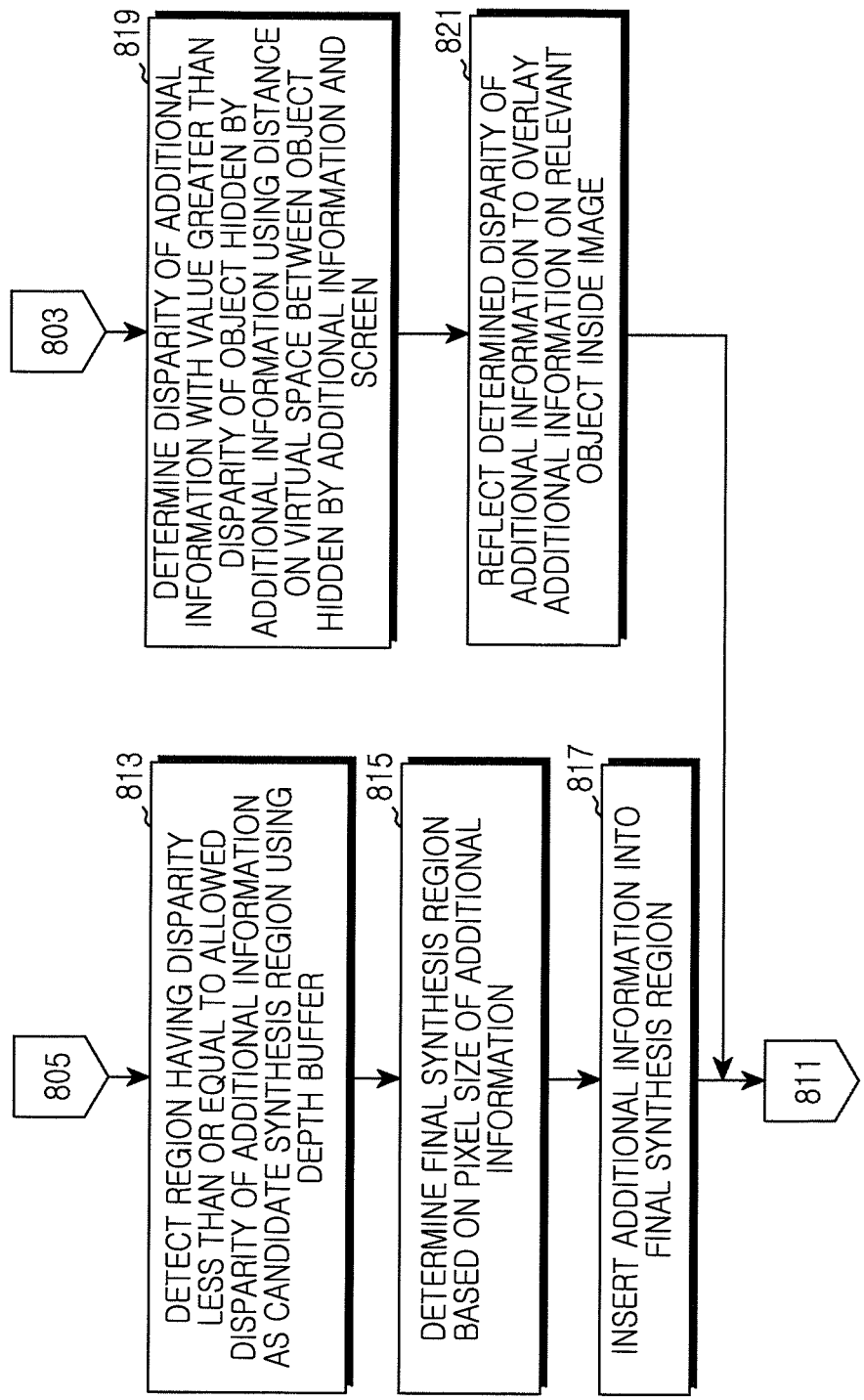

FIGS. 8A and 8B illustrate a process for synthesizing additional information while rendering an object in a 3D-based terminal according to an embodiment of the present invention.

Referring to FIG. 8A, the terminal selects one additional information to be synthesized with a final stereo image from unselected additional information in block 801.

The terminal determines whether a depth buffer is usable in synthesizing the additional information with the final stereo image in block 803.

When the depth buffer is usable in block 803, the terminal, in block 805, determines an attribute set in advance to the selected additional information to determine whether the selected additional information is additional information to which position variance has been set. Here, the attribute set in advance to the additional information includes a horizontal pixel size, a vertical pixel size, whether to allow scale, an allowed disparity, whether position is variable, and such. Here, the allowed disparity denotes a maximum disparity that may be held in a final stereo image by the additional information.

When the selected additional information is not additional information to which position variance has been set (that is, the selected additional information is additional information to which position fixation has been set in block 805), the terminal determines the disparity of the additional information with a value greater (or equal value) by a predetermined value than the disparity of an object hidden by the selected additional information using the depth buffer in block 807, and then proceeds to block 809. Here, because the disparity of the hidden object changes depending on depth values of relevant pixels inside the depth buffer, for example, the terminal detects depth values of pixels forming an object hidden by the selected additional information from the depth buffer and determines a depth value of the selected additional information using a value (or detected depth value) greater by a predetermined value than the detected depth value, thereby determining disparity of the additional information using a value greater (or equal value) by a predetermined value than the disparity of the object hidden by the selected additional information.

The terminal reflects the determined disparity of the additional information to overlay the selected additional information on the relevant object inside an image in block 809, and then proceeds to block 811.

In contrast, when the selected additional information is additional information to which position variance has been set in block 805, the terminal detects a region with a disparity of a value less than or equal to an allowed disparity set in advance to the selected additional information as a candidate synthesis region inside an image into which the selected additional information is insertable using a depth buffer in block 813, and then proceeds to block 815. Here, because the disparity changes depending on depth values of relevant pixels inside the depth buffer, for example, the terminal converts an allowed disparity of the selected additional information into a depth value on the depth buffer and compares the depth value corresponding to the allowed disparity with depth values of respective pixels inside the depth buffer to detect a region including pixels with a depth value greater than or equal to the depth value corresponding to the allowed disparity as the candidate synthesis region of the selected additional information.

For example, to form the image of the additional information on the zero parallax point, the disparity of the additional information (that is, a pixel difference between a left screen and a right screen) should always maintain '0', and accordingly, the additional information should be synthesized in a region on which the image of an object is formed on a positive parallax region in a stereo image. Therefore, the terminal converts an allowed disparity of '0' into a depth value on the depth buffer, compares the depth value corresponding to the allowed disparity of '0' with depth values of respective pixels inside the depth buffer to detect a region including pixels with a depth value greater than or equal to the depth value corresponding to the allowed disparity of '0' as the candidate synthesis region of the additional information.

The terminal determines an arbitrary portion of the detected candidate synthesis region into which the selected additional information is insertable as a final synthesis region based on pixel size (that is, a horizontal pixel size and a vertical pixel size) of the selected additional information in block 815, and then proceeds to block 817.

The terminal inserts the selected additional information into the determined final synthesis region in block 817, and then proceeds to block 811.

In contrast, when the depth buffer is not usable in block 803, the terminal determines the disparity of the additional information with a value greater (or equal value) by a predetermined value than the disparity of an object hidden by the selected additional information using a distance (that is, a depth value on a space of the hidden object) on a virtual space between the object hidden by the selected additional information and a screen in block 819, and then proceeds to block 821. Here, because the disparity changes depending on a distance on the virtual space between the object and the screen, for example, the terminal determines a distance on the virtual space between the object hidden by the selected additional information and the screen and determines a distance on the virtual space between the additional information and the screen using a distance less (or equal distance) by a predetermined value than the determined distance, thereby determining the disparity of the additional information using a value greater (or equal value) by a predetermined value than the disparity of the object hidden by the selected additional information.

The terminal reflects the determined disparity of the additional information to overlay the selected additional information on the relevant object inside an image in block 821, and then proceeds to block 811.

The terminal determines whether there is additional information to be synthesized with the final stereo image in block 811.

When there is additional information to be synthesized with the final stereo image in block 811, the terminal returns to block 801 to repeatedly perform subsequent blocks.

In contrast, when there is no additional information to be synthesized with the final stereo image in block 811, the terminal determines that it has completed synthesis for all additional information, and ends the algorithm according to an embodiment of the present invention.

For contents in which an attribute is not determined in advance in additional information, the additional information may be synthesized always before an object existing inside an image. That is, the disparity of the additional information is set greater than that of an object hidden by the additional information, such that the additional information may be always projected to the front.

As described above, according to embodiments of the present invention, a 3D-based terminal synthesizes additional information with disparity with consistency with objects forming a scene or synthesizes additional information on a region with an allowed disparity of the additional information while rendering the object, such that a 3D effect intended by a contents provider may be maintained and so a natural stereo image may be provided to a user, and a fatigue felt by the user may be prevented.

Although the invention has been shown and described with reference to certain embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method to synthesize additional information in a three-dimensional (3D) image, the method comprising:
    determining, by a processor, a disparity value of the additional information to be added, wherein the disparity value of the additional information is greater by a predetermined value than a disparity value of an object to be located behind the additional information; and
    displaying the 3D image where the additional information is overlaid according to the disparity value of the additional information, wherein the additional information comprises at least one informative element distinguished from the 3D image.

2. The method of claim 1, wherein determining the disparity value of the additional information comprises:
    detecting a first depth value of pixels forming the object using a depth buffer; and
    determining a second depth value for the additional information so that the second depth is greater by the predetermined value than the first depth value.

3. The method of claim 1, further comprising:
    selecting a region comprising a disparity value that is less than or equal to an allowed disparity value for the additional information as a synthesis region to insert the additional information.

4. The method of claim 3, further comprising:
    determining a portion of the synthesis region as a final synthesis region to insert the additional information based on a pixel size of the additional information; and
    inserting the additional information into the final synthesis region.

5. The method of claim 4, further comprising if the final synthesis region is less than the pixel size of the additional information, scaling the additional information.

6. The method of claim 1, wherein determining the disparity value of the additional information comprises:
    determining the disparity value of the additional information that is greater by the predetermined value than the disparity value of the object using a distance on a virtual space between the object and a screen.

7. The method of claim 6, wherein determining the disparity value of the additional information comprises:
    determining a first distance on the virtual space between the object and the screen; and
    determining a second distance on the virtual space between the additional information and the screen so that the distance is less by a predetermined value than the first distance.

8. The method of claim 1, wherein the disparity value of the additional information is changed based on a disparity value of another object to be located behind the additional information, if the additional information is moved.

9. The method of claim 1, wherein the disparity value of the additional information is changed in response to a change of the disparity value of the object.

10. A terminal that supports three-dimensional (3D) graphics to synthesize additional information, the terminal comprising:
    a processor configured to determine a disparity value of the additional information to be added, wherein the disparity value of the additional information is greater by a predetermined value than a disparity value of an object to be located behind the additional information; and
    a display unit configured to display a 3D image where the additional information is overlaid according to the disparity value of the additional information, wherein the additional information comprises at least one informative element distinguished from the 3D image.

11. The terminal of claim 10, wherein the processor is further configured to determine the disparity value by detecting a first depth value of pixels forming the object using a depth buffer, and determining a second depth value for the additional information so that the second depth value is greater by a predetermined value than the first depth value.

12. The terminal of claim 10, wherein the processor is further configured to select a region comprising a disparity value that is less than or equal to an allowed disparity value for the additional information as a synthesis region to insert the additional information.

13. The terminal of claim 12, wherein the processor is further configured to determine a portion of the synthesis region as a final synthesis region to insert the additional information based on a pixel size of the additional information, and
    insert the additional information into the final synthesis region.

14. The terminal of claim 13, wherein the processor is further configured to scale the additional information if the final synthesis region is less than the pixel size of the additional information.

15. The terminal of claim 10, wherein the processor is configured to determine the disparity of the additional information that is greater by the predetermined value than the background disparity value of the object using a distance on a virtual space between the object and a screen.

16. The terminal of claim 15, wherein the processor is further configured to determine the disparity value by determining a first distance on the virtual space between the object and the screen, and determining a second distance on the virtual space between the additional information and the screen so that the second distance is less by a predetermined value than the first distance.

17. The terminal of claim 10, wherein the disparity value of the additional information is changed based on a disparity value of another object to be located behind the additional information, if the additional information is moved.

18. The terminal of claim 10, wherein the disparity value of the additional information is changed in response to a change of the disparity value of the object.

19. A terminal that supports three-dimensional (3D) graphics to synthesize additional information, the terminal comprising:
    a graphics processor configured to process 3D graphic data, the graphics processor comprising:
        a detector configured to determine a disparity value of the additional information that is greater by a predetermined value than a disparity value of an object to be hidden by the additional information to be synthesized using a depth buffer, and a synthesizer configured to overlay the additional information on an image based on the determined disparity value of the additional information; and a display unit configured to display the processed 3D graphic data comprising the image and the overlaid additional information, wherein the additional information comprises at least one informative element distinguished from the 3D image.

20. The terminal of claim 19, wherein the detector is further configured to determine the disparity value by detecting a depth value of pixels forming the object to be hidden by the additional information using the depth buffer, and determining a depth value of the additional information using a value that is greater by the predetermined value than the detected depth value.

21. The terminal of claim 19, wherein the detector is further configured to select a region comprising a disparity value that is less than or equal to an allowed disparity for the additional information as a synthesis region to insert the additional information using the depth buffer.

22. The terminal of claim 21, wherein the detector is further configured to determine a portion of the synthesis region as a final synthesis region to insert the additional information based on a pixel size of the additional information, and wherein the synthesizer is further configured to insert the additional information into the final synthesis region.

23. The terminal of claim 22, wherein the detector is further configured to scale the additional information if the final synthesis region is less than the pixel size of the additional information.

24. The terminal of claim 19, further comprising:

a determination unit configured to determine the disparity value of the additional information that is greater by the predetermined value than the disparity value of the object using a distance on a virtual space between the object and a screen.

25. The terminal of claim 24, wherein the determination unit is further configured to determine the disparity value by determining a first distance on the virtual space between the object and the screen, and determining a second distance on the virtual space between the additional information and the screen so that the second distance is less by a predetermined value than the first distance.

26. The terminal of claim 19, wherein the disparity value of the additional information is changed based on a disparity value of another object to be located behind the additional information, if the additional information is moved.

27. The terminal of claim 19, wherein the disparity value of the additional information is changed in response to a change of the disparity value of the object.

28. A method to synthesize additional information in a three-dimensional (3D) based terminal, the method comprising:

processing 3D graphic data;

determining a disparity value of the additional information with a value that is greater by a predetermined value than the disparity value of an object to be hidden by the additional information to be synthesized using a depth buffer;

overlaying the additional information on an image based on the determined disparity value of the additional information; and displaying the processed 3D graphic data comprising the image and the overlaid additional information, wherein the additional information comprises at least one informative element distinguished from the 3D image.

* * * * *